Jan. 11, 1955  R. P. SCHWAB  2,699,109
FRUIT JUICE EXTRACTOR
Filed Sept. 26, 1951

*INVENTOR.*
ROBERT P. SCHWAB
BY

ATTORNEY

United States Patent Office 2,699,109
Patented Jan. 11, 1955

2,699,109

FRUIT JUICE EXTRACTOR

Robert P. Schwab, Gainesville, Ga.

Application September 26, 1951, Serial No. 248,333

2 Claims. (Cl. 100—234)

This invention relates to a fruit juice extractor, and more particularly to a portable, or hand-operated fruit juice extractor of the type commonly referred to as a "lemon squeezer."

Prior art devices of this sort were cumbersome, unattractive and did not provide adequate protection to prevent the extracted fruit juice from getting on the user and the user's companions.

It is an object of my invention to provide a fruit juice extractor which is small in size, attractive in appearance and which fully protects the user from the extracted fruit juice.

Another object of my invention is to provide a semicircular fruit juice extractor comprising a pair of complementary fan-shaped sections which are snugly fitted together and pivotally connected.

Another object of my invention is to provide a fruit juice extractor which is inexpensive to manufacture, rugged in construction, attractive in appearance and efficient in operation.

Other and further objects and advantages of my invention will be apparent from the following description taken in connection with the accompanying drawing in which like characters of reference designate corresponding parts throughout the views, and wherein.

In the embodiment chosen for purpose of illustration, my invention comprises a semi-circular housing composed of two complementary fan-shaped sections, 10, 10', each of which is provided with substantially flat side walls, the walls of each section being spaced apart and connected together by arcuate outer rims or edges which may be formed integrally with the side walls. The walls of the section 10' are spaced apart a distance slightly less than the spacing of the walls of the section 10, so that the section 10' can be partially received within the section 10. The two sections, 10 and 10', are pivotally connected together by a rivet 11, or other suitable means, which is inserted through suitable holes 12, 12', provided in the upper corner of the sections 10, 10', respectively.

Figure 1:
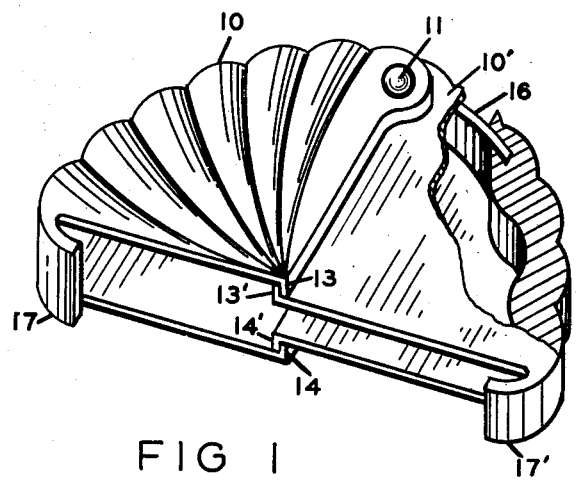
Fig. 1 is a perspective view with some parts shown partially in section, of a fruit juice extractor embodying my invention.
Figure 2:
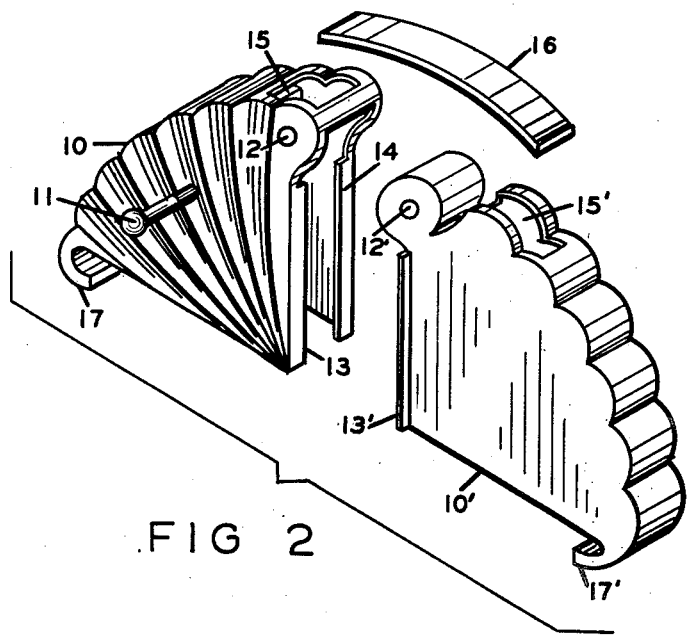
Fig. 2 is an exploded view of the device shown in Fig. 1.

The section 10 is provided along its edge facing the section 10' with inwardly turned flanges 13, 14, and the section 10' is provided along its complementary edge facing the section 10 with outwardly turned flanges 13', 14', which cooperate with the flanges 13, 14, respectively, to prevent the section 10' from sliding out of the section 10 when the two sections are pivotally joined together, as shown in Fig. 1.

Adjacent the corners in which the rivet 11 is placed, the sections 10, 10' are provided in their arcuate outer rim portions with recesses 15, 15', adapted to receive a leaf spring 16 which has its ends held in the slots or recesses 15, 15', the spring 16 being of such shape as to urge the sections 10, 10' apart. The sections are prevented from swinging apart by the cooperating flanges 13, 13' and 14, 14' which are brought into engagement, as shown in Fig. 1, by the action of the spring 16.

Adjacent the diametrically opposed outer corners, the arcuate rim portions of the sections 10, 10' are provided inwardly turned lips 17, 17', which underlie the chamber provided between the spaced walls of the sections.

In the use of my device, the fruit from which juice is to be extracted is cut into semi-circular slices of a thickness to be received between the side walls of the two sections. If the slice is too thin to be snugly received within the device, the overhanging lips 17, 17' will assist in retaining the fruit in place, and these lips also serve as means for suspending my device from the rim of a tumbler or cup, if desired, until it is desired to extract the juice from the fruit.

It will be noted that my device can be readily picked up without touching the fruit therein, and the juice can be easily extracted by squeezing the two sections of my device together by pressure upon the arcuate rim portions. Because the sections of my device are snugly fitted together and completely cover the slice of fruit except along the bottom edge of my device, juice can only run out at the bottom and is adequately prevented from squirting out in any other direction, thus protecting both the user and the user's companions from being annoyingly sprinkled with juice.

It will be obvious that my invention provides an article of great convenience and usefulness, and that various changes may be made in the construction thereof without departing from the scope of my invention as defined in the appended claims.

I claim:

1. A fruit juice extractor comprising a pair of complimentary fan-shaped sections, each said section being provided with substantially parallel side walls spaced apart and connected together by arcuate outer rim portions extending through arcs of approximately 90° each, each of said side walls having two substantially straight edges extending respectively from a central point to an end of the arcuate rim portion connected thereto, one of said sections fitting within the other of said sections with a snug sliding fit, fastening means pivotally connecting said sections together adjacent said arcuate rim portions to form a semi-circular unit which is closed except along the diametral line formed by certain of said straight edges, a leaf spring having ends held in said recesses adapted to urge said sections apart, and flanges along other of said straight edges on said sections cooperatively engaged to hold said sections together.

2. A fruit juice extractor comprising a pair of complementary fan-shaped sections, each said section being provided with substantially parallel side walls spaced apart and connected together by arcuate outer rim portions extending through arcs of approximately 90° each, each of said side walls having two substantially straight edges extending respectively from a central point to an end of the arcuate rim portion connected thereto, one of said sections fitting within the other of said sections with a snug sliding fit, fastening means pivotally connecting said sections together adjacent said arcuate rim portions to form a semi-circular unit which is closed except along the diametral line formed by certain of said straight edges, said rim portions having recesses, a leaf spring having ends held in said recesses adapted to urge said sections apart, flanges along other of said straight edges on said sections cooperatively engaged to hold said sections together, and inwardly turned lips on the bottom of said sections constituting means for holding slices of fruit within said extractor.

References Cited in the file of this patent

UNITED STATES PATENTS

| Number | Name | Date |
|---|---|---|
| 683,347 | Smith | Sept. 24, 1901 |
| 896,044 | Quackenbush | Aug. 11, 1908 |
| 930,796 | Quackenbush | Aug. 10, 1909 |
| 971,573 | Symonds | Oct. 4, 1910 |
| 995,286 | Pender | June 13, 1911 |
| 1,107,230 | Weis | Aug. 11, 1914 |
| 2,220,458 | Osterman | Nov. 5, 1940 |

FOREIGN PATENTS

| Number | Country | Date |
|---|---|---|
| 68,639 | Switzerland | July 1, 1915 |